UNITED STATES PATENT OFFICE.

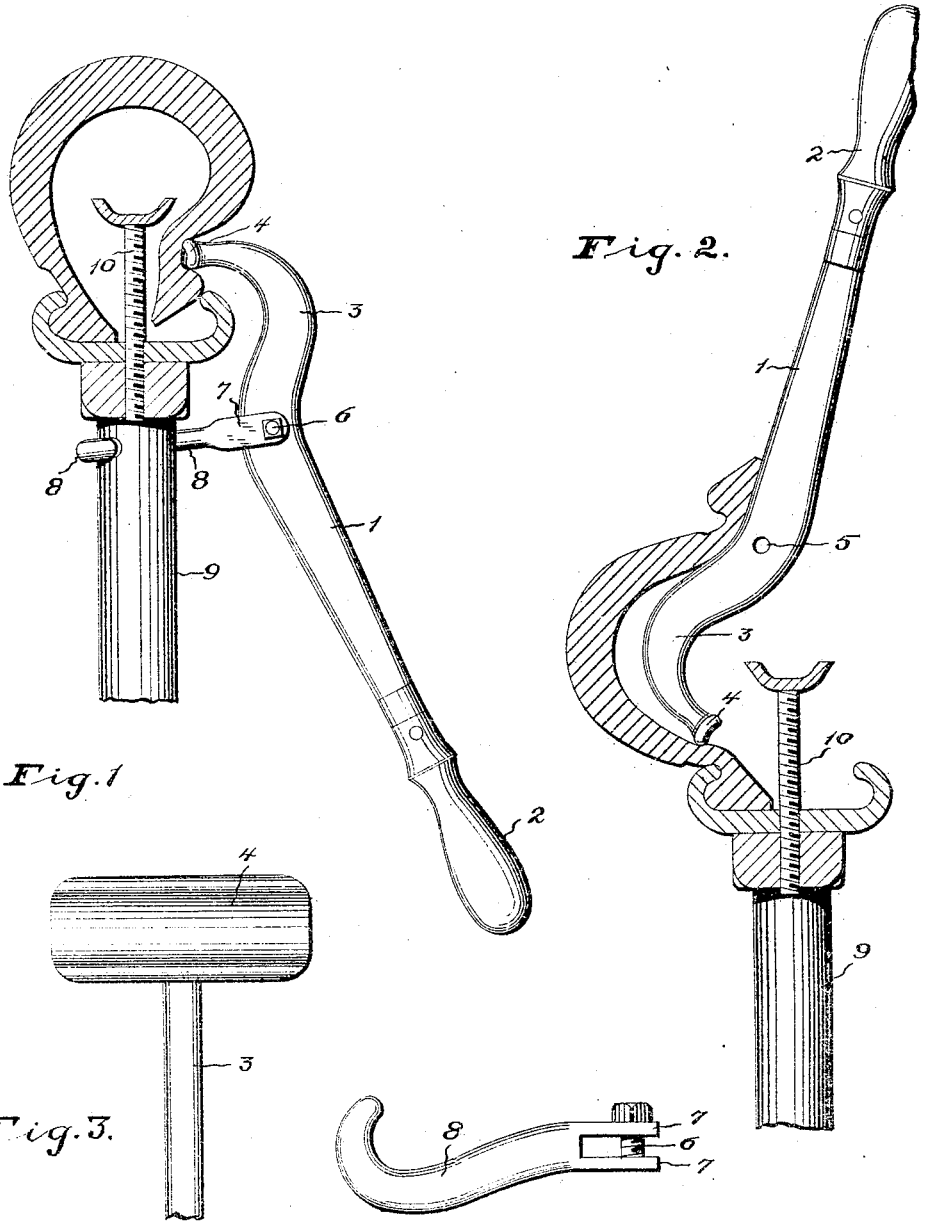

CHARLES McCARTHY AND MILLROY M. PHENICE, OF COLUMBUS, OHIO.

VEHICLE-TIRE TOOL.

No. 816,354.  Specification of Letters Patent.  Patented March 27, 1906.

Application filed March 18, 1905. Serial No. 250,812.

*To all whom it may concern:*

Be it known that we, CHARLES McCARTHY and MILLROY M. PHENICE, citizens of the United States, residing at Columbus, in the county of Franklin and State of Ohio, have invented certain new and useful Improvements in Vehicle-Tire Tools, of which the following is a specification.

Our invention relates to a new and useful vehicle-tire tool.

The object of the invention is to provide a simple tool of superior construction arranged so as to be engaged with the vehicle-wheel to give great leverage, so that the casing of a tire may be readily disengaged from the rim with comparatively little exertion.

Another feature resides in so constructing the tool that it may be advantageously employed in replacing the casing and being of an especial assistance and use in replacing the tire-holding lugs.

Finally, the object of the invention is to provide a tool of the character described that will be strong, durable, efficient, and comparatively inexpensive to make, also one in which the several parts will not be liable to get out of working order.

With the above and other objects in view the invention consists of the novel details of construction and operation, a preferable embodiment of which is described in the specification and illustrated in the accompanying drawings, wherein—

Figure 1 is a cross-sectional view of a wheel-rim and a tire-casing, showing our improved tool in position and having its end in engagement with the tire-casing, which has been pressed inward and out of the rim. Fig. 2 is a cross-sectional view showing the tool in elevation and pressing back the casing, so as to allow the lug to be inserted during the operation of placing the tire in position, the hook being removed. Fig. 3 is a partial inner side elevation of the outer end of the tool, and Fig. 4 is a plan view of the hook.

In the drawings the numeral 1 designates a lever-arm which is formed at its lower or long end with a suitable handle 2, it being understood that the handle may either be formed integral with the said lever-arm or separately thereof and suitably secured thereto. The lever-arm 1 has the general form toward its outer end of an ogee curve or is formed at its outer end with what we have termed a "gooseneck" 3. This portion or gooseneck 3 is curved so as to loop over the side of the rim and engage with the tire. At its extreme end the arm is formed with a concaved and rounded plate 4, preferably formed integral on the arm. This plate provides an elongated and comparatively broad surface which when brought into contact with the tire will not deface or injure the same. Preferably at the inner section of the curved portion 3 and the lever-arm we provide an aperture or opening 5, adapted to receive a screw-bolt 6, which passes through the furcations 7 of the bifurcated end of a hook 8. The lever-arm being received in the bifurcated ends, the furcations will stand on each side thereof, and the hook will thus be pivotally supported by the bolt 6. The hook is curved or offset, so that when it is engaged with the spoke 9 the lever-arm will only stand at a slight distance to one side, thus bringing the pressure when the lower end of the hook is swung outward more directly in line with the spoke.

In utilizing the invention for removing the casing of a tire after the lug 10 has been forced upward by suitable means the hook 8 is engaged with the spoke 9 and the plate 4 brought into contact with the tire-casing just above the clencher-rim. The operator grasping the handle 2 and by pulling the same outward the portion 3 or gooseneck is forced inward, which pushes the heel of the tire inward and out of engagement with the clencher-rim, thereby allowing the holding-tool, which forms the subject-matter of a separate application, filed March 18, 1905, and bearing Serial No. 250,813, to be engaged under the tire and force the same upward in the usual manner. It will be apparent that by employing the hook 8 and engaging the same above the spoke 9 great leverage is had and a comparatively light force exerted on the handle end of the lever-arm 1 will cause the short end or curved portion 3 to be forced against the tire-casing with sufficient force to press the said casing out of the clencher-rim.

In utilizing the tool when placing a new casing on the rim or putting the old casing back in place the screw-bolt 6 is disengaged from the threaded aperture 5 and the hook 8 removed. One side of the tire having been placed in the clencher-rim in the usual manner, the gooseneck is inserted in the tire so as to cause the concaved surface of the plate 4 to rest on the inner surface of the tire over the rim. Then by moving the lever-arm upward to the position indicated in Fig. 2 the casing will be forced back, thus allowing the lug 10 to be readily inserted or removed. After the lugs have been inserted the hook 8 may again be placed on the lever-arm and the tool employed to force the free end of the casing inward, so that it will readily spring into the clencher-rim when the pressure is relieved. Considerable trouble has heretofore been experienced in removing and replacing the lugs; but it is apparent that by employing the tool herein described the lugs may not only be expeditiously removed or replaced, but free access thereto will be had, thus enabling the operator to inspect his work as he proceeds.

We do not wish to limit ourselves to the exact details of construction and operation herein described, as we may make various changes wholly within the scope of our claims without departing from the spirit of the invention.

Having now fully described our invention, what we claim, and desire to secure by Letters Patent, is—

1. A tool for removing pneumatic-tire casings from clencher-rims, comprising a lever having a curved portion at one end which terminates in an elongated curved tire-engaging face, a handle provided at the other end of said lever and a hook pivotally secured to the lever intermediate its ends; said hook lying in a plane transverse to that of the said lever.

2. A tool for removing vehicle-tires, comprising a lever having a curved portion at one end thereof, said curved portion terminating in an elongated tire-engaging plate curved upon its face and provided with rounded edges and a handle formed at the other end of said lever and a hook pivotally secured to the lever intermediate its ends and extending transversely thereto.

In testimony whereof we affix our signatures in presence of two witnesses.

CHARLES McCARTHY.
MILLROY M. PHENICE.

Witnesses:
  A. L. PHELPS,
  M. B. SCHLEY.